No. 648,489. W. L. R. EMMET. Patented May 1, 1900.
SYSTEM OF DISTRIBUTION.
(Application filed Mar. 10, 1899.)
(No Model.)
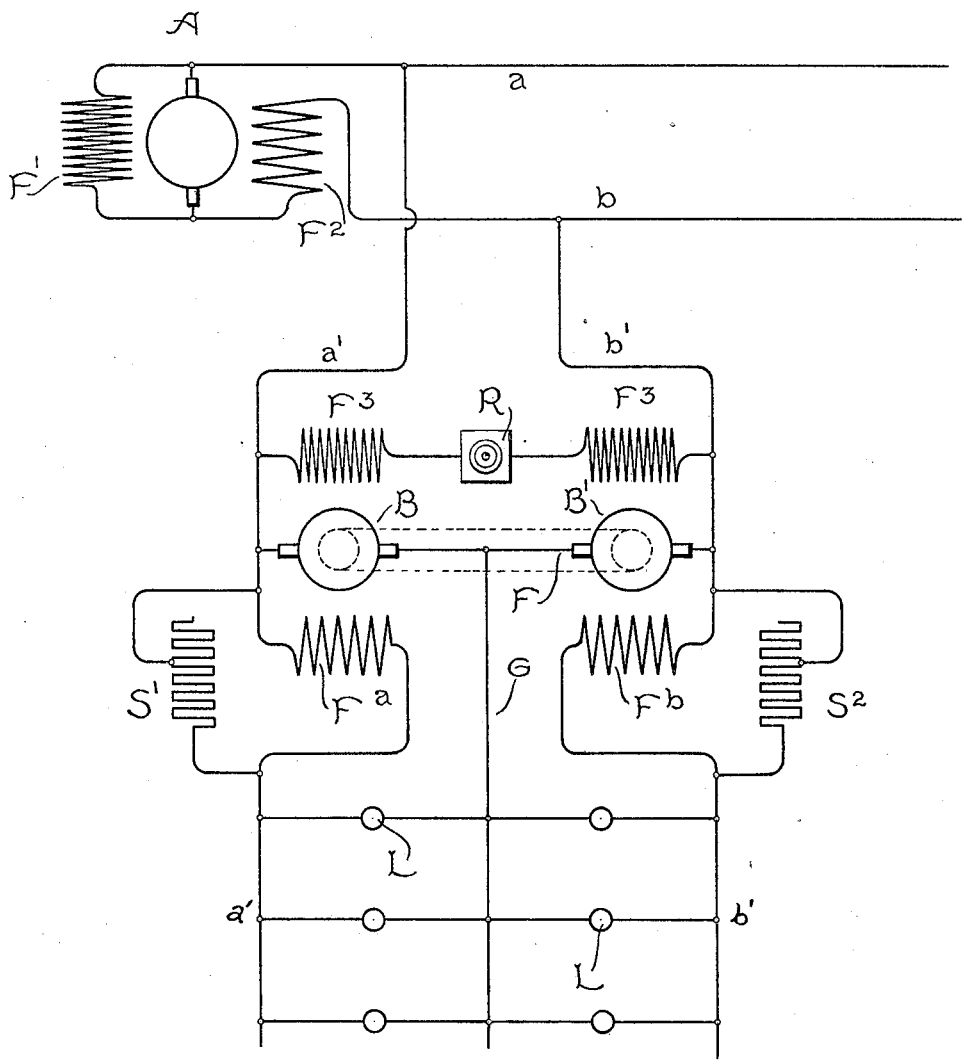
Witnesses.
Edward Williams, Jr.
Benjamin B. Hull.
Inventor:
William L. R. Emmet,
by Albert G. Davis.
Atty.

UNITED STATES PATENT OFFICE.

WILLIAM L. R. EMMET, OF SCHENECTADY, NEW YORK, ASSIGNOR TO THE GENERAL ELECTRIC COMPANY, OF NEW YORK.

SYSTEM OF DISTRIBUTION.

SPECIFICATION forming part of Letters Patent No. 648,489, dated May 1, 1900.

Application filed March 10, 1899. Serial No. 708,470. (No model.)

*To all whom it may concern:*

Be it known that I, WILLIAM L. R. EMMET, a citizen of the United States, residing at Schenectady, in the county of Schenectady, State of New York, have invented certain new and useful Improvements in Systems of Distribution, (Case No. 668,) of which the following is a specification.

The present invention relates to systems of distribution in which compensators are employed in the well-known two-wire and three-wire systems to transfer energy from one side of a three-wire system to the other as the load on the two sides becomes unbalanced, and has for its object to arrange the compensators in such manner that they will compound for drop in both sides of the three-wire system.

In the accompanying drawing, A represents a compound direct-current generator having a shunt-winding $F'$ and a series winding $F^2$, supplying current to the circuit-mains $a\ b$.

Connected across mains $a\ b$ is a compensator, comprising two machines B B', with their armatures belted or otherwise mechanically connected, as indicated by the dotted line. The armatures are electrically connected in series by wire F, from which extends the neutral wire or conductor G. The machines are provided with shunt-field windings $F^3\ F^3$, connected across the outside branch mains $a'\ b'$. Included in this circuit is an adjustable resistance R. If desired, these fields may be included in separate circuits. The load is represented by lamps L; but any other form of translating device may be employed.

Thus far the arrangement is the same as the well-known compensating system; but in addition to this I provide series coils $F^a$ and $F^b$ for compounding the machines B B'. Coil $F^a$ is connected in series with main $a'$ and strengthens the field of the machine B to compensate for drop when the load is increased between main $a'$ and neutral wire G. Coil $F^b$ is connected in series with main $b'$ and varies the field strength of machine B' when the load between main $b'$ and neutral wire G changes. The ratio of compounding of the machines can be adjusted by varying the current flow in coils $F^a$ and $F^b$ in the usual way by means of the adjustable shunts $S'\ S^2$.

The method of operation is as follows: Assume, for example, that generator A is a one-hundred-and-twenty-five-volt machine and that machines B and B' each take sixty-two and one-half volts and a small current, enough to overcome friction, when there is an equal load on both sides of the three-wire system. If the load on one side increases, the field of machine B is strengthened by the series coil $F^a$. The balance between the two armatures is thus destroyed. The machines being mechanically connected, when the field of one is increased it acts as a generator driven by the other machine as a motor, the speed of the latter machine being maintained constant under its increased load by the increased voltage due to the compound winding of the generator. The difference of potential between main $a'$ and neutral wire G is thus increased by an amount corresponding to the voltage produced by machine B, thus compensating for drop due to the increased load. If the load on the other side of the system is increased, the same action takes place, except that in this case the machine B' acts as a generator instead of B.

What I claim as new, and desire to secure by Letters Patent of the United States, is—

1. In a system of distribution, the combination of mains connected to the source of supply, compensating machines driven by energy derived from said mains and connected across the mains and to a neutral conductor, shunt-field windings for partially exciting said machines, and a series winding on each machine for furnishing the balance of the excitation.

2. In a system of distribution, the combination of mains connected to the source of supply, compensating machines driven by energy derived from said mains and connected in shunt across the mains and to a neutral conductor, shunt-field windings connected across the mains for partially exciting the compensating machines, a regulating resistance, and a series winding on each machine, which is connected in circuit with the mains leading from the source of supply.

3. In a system of distribution, the combination of a generator, mains connected therewith, a pair of compensating machines mechanically coupled together and driven solely by electrical energy supplied thereto, a shunt and series winding for each machine, the shunt-windings being connected across the mains, and the series windings in series with separate mains and a neutral conductor connected to the armature-circuit of said compensating machines.

4. The combination of mains between which a difference of potential is maintained, compensating machines driven by energy derived from said mains, windings on said machines, one of which windings is in series with one of said mains and another of said windings in series with another of said mains, and a neutral conductor upon which the compensating machines maintain a potential intermediate between the potentials of the mains.

In witness whereof I have hereunto set my hand this 8th day of March, 1899.

WILLIAM L. R. EMMET.

Witnesses:
BENJAMIN B. HULL,
MABEL E. JACOBSON.